United States Patent
Ito

(10) Patent No.: US 6,204,983 B1
(45) Date of Patent: Mar. 20, 2001

(54) APPARATUS FOR RECORDING DATA ON MAGNETIC RECORD MEDIUM

(75) Inventor: Hajime Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/175,118

(22) Filed: Oct. 19, 1998

(30) Foreign Application Priority Data

Nov. 13, 1997 (JP) .................................................. 9-312098

(51) Int. Cl.$^7$ ................................. G11B 5/03; G11B 5/09
(52) U.S. Cl. ................................................ 360/66; 360/46
(58) Field of Search .................................. 360/46, 61, 66

(56) References Cited

U.S. PATENT DOCUMENTS

| | | | |
|---|---|---|---|
| 4,532,562 | 7/1985 | Powell | 360/78 |
| 4,802,050 | 1/1989 | Miyabayashi et al. | 360/135 |
| 4,901,169 | 2/1990 | Hamaoka et al. | 360/66 |
| 5,053,893 | 10/1991 | Hayata et al. | 360/66 |
| 5,060,089 | 10/1991 | Cleveland | 360/51 |

OTHER PUBLICATIONS

Patent Abstracts of Japan, JP 62–097106, Published May 6, 1987, Mitsubishi Electric Corp.

Patent Abstracts of Japan, JP 61–287008, Published Dec. 18, 1986, Alps Electric Co. Ltd.

Patent Abstracts of Japan, JP 1–263901, Published Oct. 20, 1989, Yamaha Corp.

*Primary Examiner*—W. Chris Kim
(74) *Attorney, Agent, or Firm*—Limbach & Limbach L.L.P.

(57) ABSTRACT

To ensure an overwrite characteristic for a magnetic disk and restrain the occurrence of waveform distortion. When record data (updated data) is recorded on a target area of a magnetic disk, a dc erase is effected to thereby ensure a requested overwrite characteristic. Next, erasing data of a constant frequency is recorded i.e., an intermediates wavelength erase is accomplished. Then, the record data is recorded. Since the erasing data is recorded before the recording of the record data, a magnetized pattern corresponding to the erasing data is formed over a recording layer (magnetic film) as a bed and waveform distortion is restrained from occurring due to the execution of the dc erase alone.

6 Claims, 6 Drawing Sheets

| RECORDING WAVELENGTH | OVERWRITE [dB] (2 MHz COMPONENT) |
|---|---|
| LONG WAVELENGTH (2 MHz) | 0 dB |
| DC ERASE | −24.9 dB |
| INTERMEDIATE WAVELENGTH ERASE (20 MHz) | −30.8 dB |
| SHORT WAVELENGTH (UPDATED DATA) (35 MHz) | −30.9 dB |

APPARATUS FOR RECORDING DATA ON MAGNETIC RECORD MEDIUM

BACKGROUND OF THE INVENTION

This invention relates to an apparatus of recording data on a magnetic disk, which is suitable for application to, for example, a large-capacity floppy disk drive or the like.

In a conventional floppy disk drive, when an erase head wide in gap is placed as previous to a read/write head and data is recorded on a floppy disk, a dc erase or an ac erase is performed by the erase head in advance and thereafter the data is recorded by the read/write head to thereby ensure a requested overwrite characteristic.

A floppy disk drive having large or mass capacities ranging from several tens of Mbytes to several hundred Mbytes has been proposed in recent years. In the large-capacity floppy disk drive, a recording density becomes high and a recording wavelength becomes short. Therefore, when an erase head is disposed as prior or previous to a read/write head, it is necessary to place the read/write head and the erase head in close proximity to each other. It is however very hard to place them close to each other in terms of a head structure. When the erase head is placed as previous to the read/write head, the entire head will increase in cost because the erase head is needed in addition to the read/write head.

It is therefore an object of the present invention to provide an apparatus of recording data on a magnetic disk, wherein a requested overwrite characteristic can be ensured by a single head alone and waveform distortion can be restrained from appearing.

SUMMARY OF THE INVENTION

In accordance with a first aspect of the present invention, a magnetic recording apparatus comprises a magnetic head for applying a magnetic field to a magnetic record medium to form a magnetized pattern on said magnetic record medium and thereby recording record data; conversion means for converting input data into the record data having a predetermined frequency range; and control means for controlling said magnetic head so as to apply a DC magnetic field to a record area of said magnetic record medium, to apply to said record area a magnetic field that is inverted at a constant period corresponding to an intermediate frequency within said predetermined frequency range, and to apply to said record area a magnetic field that is inverted in accordance with the record data, when said magnetic head records the record data on the record area.

According to a second aspect of the present invention, said magnetic record medium is a magnetic disk.

According to a third aspect of the present invention, said magnetic head records the information on said magnetic record medium under a condition that said magnetic head floats over said magnetic record medium.

In accordance with a fourth aspect of the present invention, a magnetic recording apparatus further comprises selection means for outputting selectively the output from said conversion means or a fixed value; and inversion means for receiving the output from said selection means and inverting the magnetic field when the output from said conversion means becomes a predetermined value different from said fixed value; wherein said control means controls said magnetic head by controlling said selection means and said inversion means.

According to a fifth aspect of this invention, said control means controls said selection means to output the fixed value when said magnetic head applies the DC magnetic field to said record medium, said control means controls said conversion means to output the record data having the intermediate frequency within the predetermined frequency range when applying the magnetic field that is inverted at the constant period, and said control means controls said conversion means to output the record data that is inverted in accordance with the record data when applying to said record area the magnetic field that is inverted in accordance with the record data.

In accordance with a sixth aspect of the invention, a method of recording record data on a predetermined area of a magnetic record medium comprises the steps of: applying a DC magnetic field to the predetermined area; applying to the predetermined area a magnetic field that is inverted at a constant period corresponding to a frequency within a frequency range of the record data; and applying to the predetermined area a magnetic field that is inverted in accordance with the record data.

BRIEF DESCRIPTION OF THE DRAWINGS

For a better understanding of the invention, and to show how the same may be carried into effect, reference will now be made, by way of examples, to the accompanying drawings, in which FIG. 6 is a diagram showing an overwrite characteristic at the time that a dc erase process is done, and FIG. 7 is a diagram for describing improvements in overwrite characteristic based on the dc erase process and the like.

DETAILED DESCRIPTION

Figure 1:
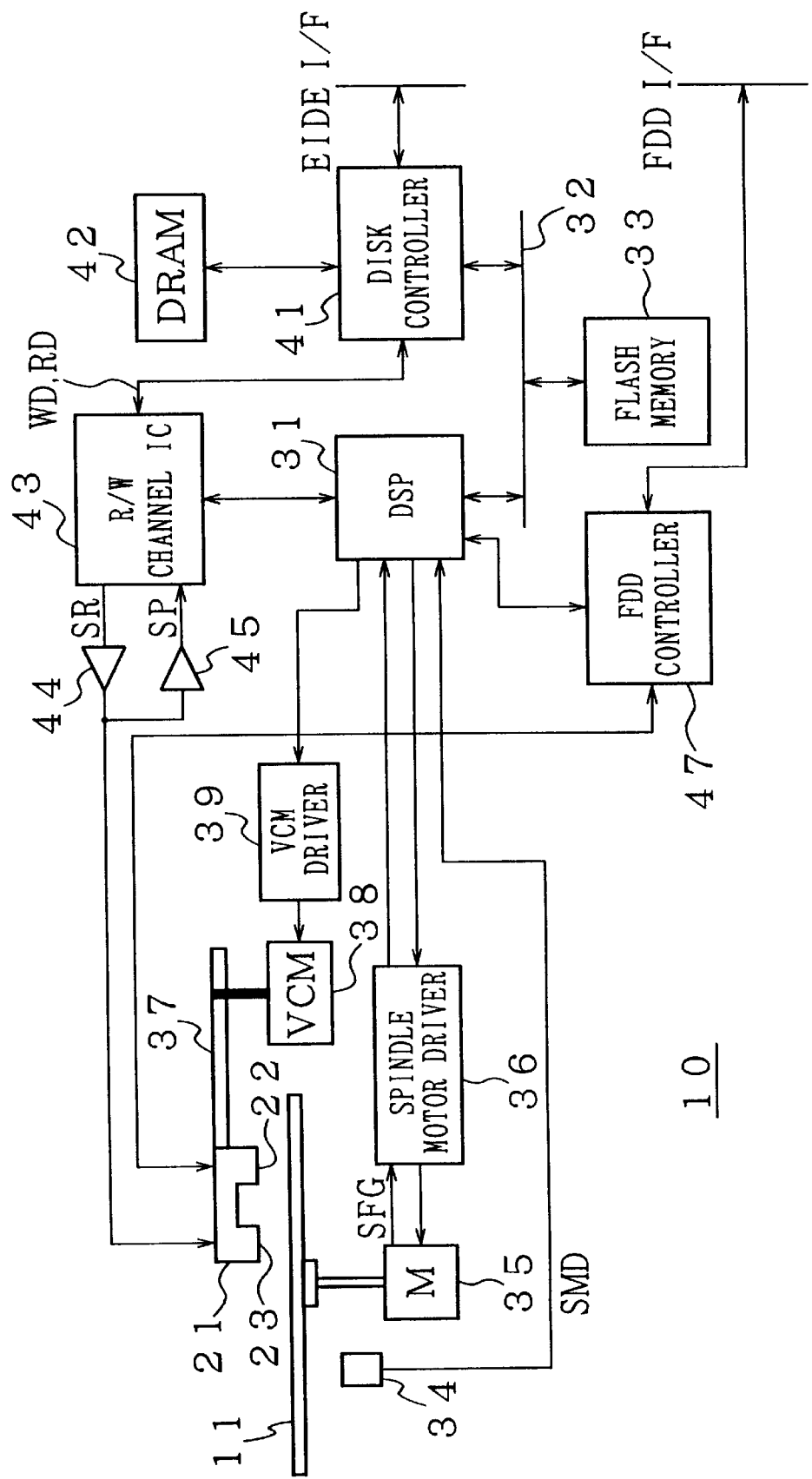
FIG. 1 is a block diagram showing a configuration of a floppy disk drive used as an embodiment, FIG. 2 A is a diagram showing one example of a large-capacity floppy disk.
Figure 2A:
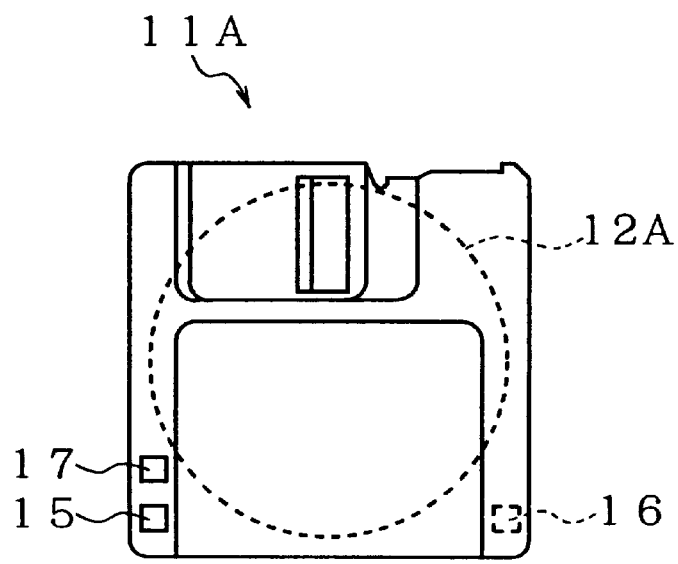
FIG. 2B is a diagram showing an already-existing floppy disk.
Figure 2B:
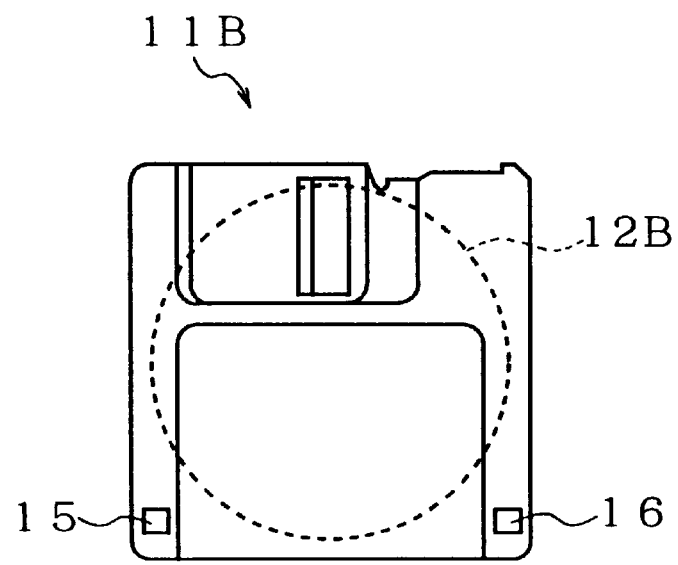

An embodiment of the present invention will hereinafter be described with reference to the accompanying drawings. FIG. 1 shows a floppy disk drive 10 used as one embodiment of the present invention. A floppy disk 11 available to the floppy disk drive 10 is supposed to use floppy disks 11A and 11B illustrated in FIGS. 2A and 2B. Namely, FIG. 2A shows the floppy disk 11A in which a high recording-density (high-order mode) disk medium 12A having compatibility with already-existing floppy disks and having large or mass recording capacities ranging from about several tens of Mbytes to several hundred Mbytes or greater than or equal to the above Mbytes is held therein. FIG. 2B illustrates the floppy disk 11B in which an already-existing standard recording-density (low-order mode) disk medium 12B having a recording capacity of about 2 Mbytes, for example, is held therein.

In FIGS. 2A and 2B, write protectors 15 are respectively used to exhibit a writable state when a hole is closed and a write-protect state when it is open. HD holes 16 are respectively used to show a so-called 2HD disk having a recording capacity of about 2 Mbytes (upon unformatting) when the hole is open and a disk other than the 2HD disk when the hole is closed. In FIG. 2A, a hole 17 defined in a predetermined position, other than the aforementioned write protectors 15 and HD holes 16 is used to indicate a large-capacity floppy disk whose recording capacity referred to above ranges from about several tens of Mbytes to several hundred Mbytes.

Figure 3A:
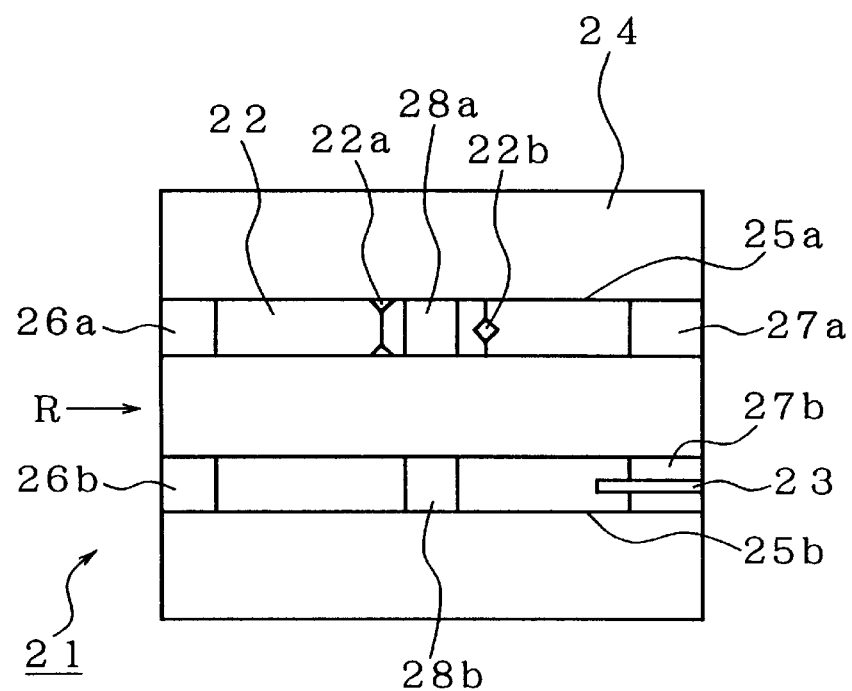
FIG. 3A is a bottom view showing a configuration of a magnetic head.
Figure 3B:
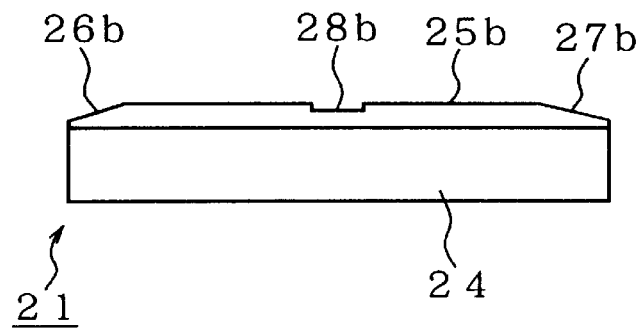
FIG. 3B is a side view showing a configuration of a magnetic head.

Referring back to FIG. 1, a standard recording-density (low-order mode) head chip 22 for the existent floppy disk 11B and a high recording-density (high-order mode) head chip 23 for the large-capacity floppy disk 11A are incorporated into a magnetic head 21 for effecting magnetic recording and reproduction or playback on the floppy disk 1. FIGS. 3A and 3B respectively show a configuration of the magnetic head 21. FIG. 3A is a bottom view of the magnetic head 21 as viewed from the floppy disk 11 side. FIG. 3B is a side view of the magnetic head 21 as viewed from the side below FIG. 3A.

The magnetic head 21 is constructed such that the aforementioned head chips 22 and 23 are incorporated into a slider 24. Two rails 25a and 25b, which extend in the same direction as a disk rotational direction R and are parallel to each other, are formed on the bottom face of the slider 24 so as to protrude therefrom. Further, the front and rear sides are defined with the disk rotational direction R as the reference, front tapers 26a and 26b are formed on the front sides of the rails 25a and 25b, and rear tapers 27a and 27b are formed on the rear sides thereof. For example, the angle formed by each of the front tapers 26a and 26b and a disk recording surface is defined as 0.5° and the angle formed by each of the rear tapers 27a and 27b and the disk recording surface is defined as 10°.

Further, the standard recording-density (low-order mode) head chip 22 is incorporated into the rail 25a. Although not described above, the floppy disk 11 is rotated at the normal speed (e.g., 300 rpm) in the low-order mode. Under the number of the revolutions referred to above, the recording and reproduction of data are performed under the condition where the slider 24 does not float or levitate, and the head chip 22 and the surface of the floppy disk 11 are kept in contact with each other. Therefore, a recording-reproducing head 22a and an erase head 22b of the head chip 22 are placed in the central position where the contact between the head chip 22 and the disk surface is brought into the stablest.

Further, the high recording-density (high-order mode) head chip 23 is incorporated into the rear side of the rail 25b. The head chip 23 takes a structure such as a MIG (Metal In Gap) head structure, which is capable of increasing a track recording density. Although not described above, the floppy disk 11 rotates at a high speed (e.g., 3600 rpm) in the high-order mode. Under the number of the revolutions referred to above, floating or levitation pressure resultant from the flow of air is produced so that the slider 24 is levitated from the floppy disk 11. Owing to the provision of the two rails 25a and 25b, the position or posture of the slider 24 can be stabilized so as to be parallel to the disk surface as viewed in the direction orthogonal to a track direction.

Since the data is not recorded and reproduced stably if the amount of levitation of the slider 24 varies, the amount of levitation (corresponding to an interval between the disk surface and a gap of the head chip 23) of the slider 24 is now set to a constant value (e.g., 50 nm). The amount of levitation thereof is changed according to the widths of the rails 25a and 25b or the like. In order to set the amount of its levitation to a low value such as 50 nm, slots (concave portions) 28a and 28b are provided substantially in the central positions of the rails 25a and 25b.

Basically, the slots 28a and 28b respectively have the function of decreasing levitation pressure generated due to the flow of air between the bottom face of the slider 24 and the disk surface. The levitation pressure decreases at the positions where the slots 28a and 28b are provided, and the levitation pressure of the slider 24 is also reduced as a whole. Owing to the functions of the slots 28a and 28b, the amount of levitation of the slider 24 on the front side thereof becomes greater than that on the rear side thereof although not shown in the drawing, so that the posture of the slider 24 as viewed from the side thereof is brought into a slightly-inclined state. Thus, when the slider 24 is in the levitated state, the edge of the slider on the rear side thereof is brought to a stable location which serves as a hard-to-change position. Therefore, the high recording-density (high-order mode) head chip 23 is incorporated into the rear side as described above.

Referring back to FIG. 1, the floppy disk drive 10 has a DSP (digital signal processor) 31 which serves as a controller for performing control on the entire disk drive. Control on the rotation of the floppy disk 11, control on the movement of the magnetic head 21, control on a high recording-density (high-order mode) record/playback system, control on a standard recording density (low-order mode) record/playback system, etc. are performed by the DSP 31. The DSP 31 is electrically connected to a bus 32. The DSP 31 fetches a program stored in a flash memory 33 electrically connected to the bus 32 and executes control operations in accordance with the program.

The floppy disk drive 10 has also a disk detector 34 which detects, using the above-described hole 17 or the like, whether the floppy disk 11 corresponds to the high recording-density (high-order mode) floppy disk 11A or the standard recording-density (low-order mode) floppy disk 11B. A signal outputted from the disk detector 34 is supplied to the DSP 31 as a mode signal SMD. The DSP3 performs control on the switching between the rotational speeds of the floppy disk 11, control on the switching of the record/playback system and control on the switching of an interface in response to the mode signal SMD.

Further, the floppy disk drive 10 has a spindle motor 35 for rotating the floppy disk 11 and a spindle motor driver 36 for driving the motor 35. A frequency signal SFG having a frequency corresponding to a rotational speed of the floppy disk 11, which is obtained from the motor 35, is supplied to the DSP 31 through the spindle motor driver 36. The DSP 31 controls the spindle motor driver 36 by reference to the frequency signal SFG so that the rotational speed of the floppy disk 11 reaches a predetermined value.

Moreover, the floppy disk drive 10 includes a voice coil motor (VCM) 38 for moving an arm 37 along a diameter direction of the floppy disk, the arm 37 being used for supporting the magnetic head 21, and a VCM driver 39 for driving the voice coil motor 38. The DSP 31 controls the VCM driver 39 based on tracking information or the like about the magnetic head 21, which is outputted from a R/W channel IC to be described later, in such a manner that the magnetic head 21 is properly positioned to a target track.

The floppy disk drive 10 has a high recording-density (high-order mode) record/playback system and a standard recording-density (low-order mode) record/playback system. The high recording-density (high-order mode) record/playback system includes a disk controller 41 for swapping data, status, commands with the host computer side, a DRAM (Dynamic random access memory) 42 which serves as a data buffer, a R/W channel IC 43 for performing a record signal process and a reproduce or playback signal process, a recording amplifier 44 for amplifying a record signal outputted from the R/W channel IC 43 and supplying the amplified signal to the head chip 23 of the magnetic disk 23, and a reproduce or playback amplifier 45 for amplifying a signal played back or reproduced by the head chip 23 and supplying it to the R/W channel IC 43.

Figure 4:
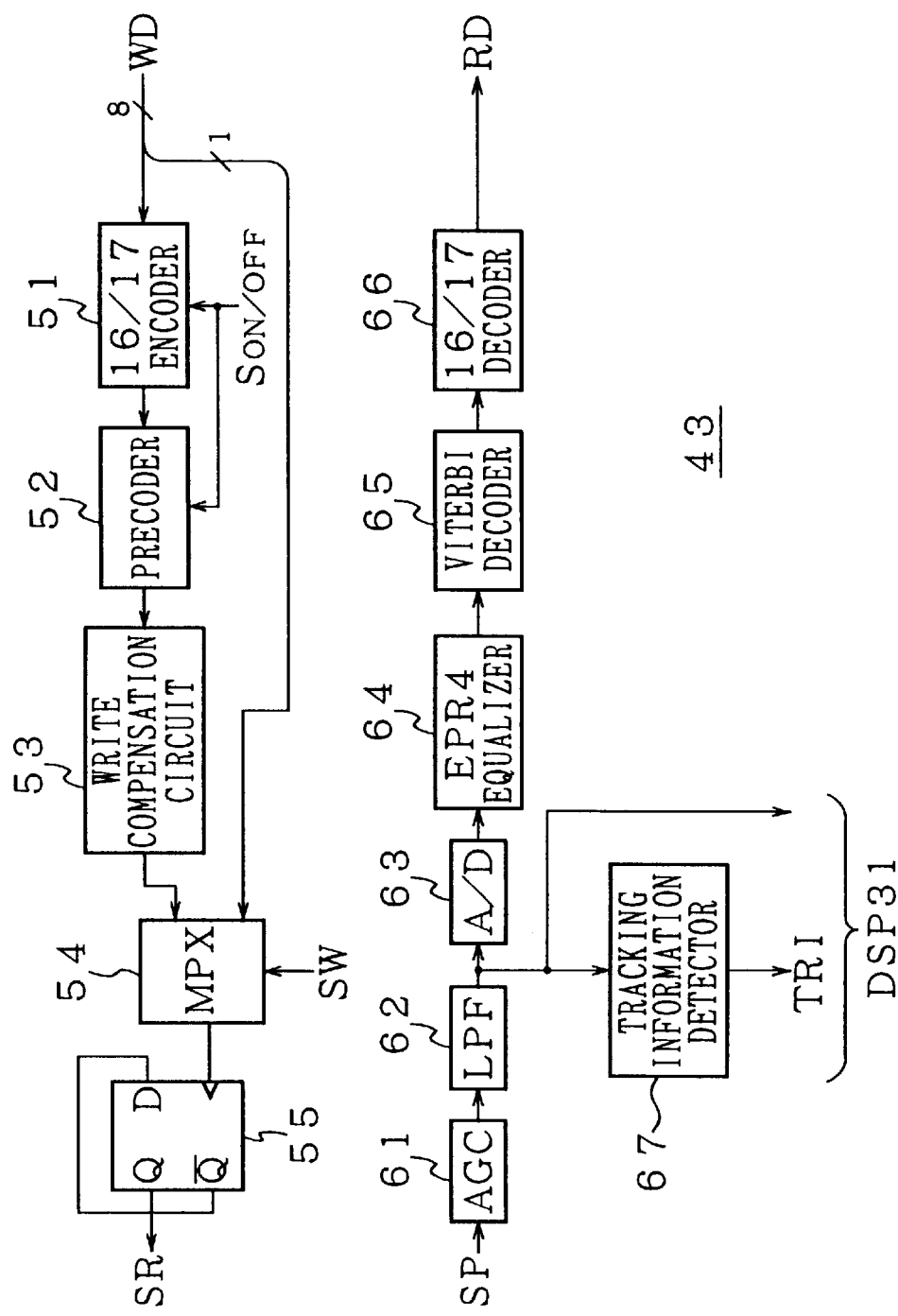
FIG. 4 is a block diagram illustrating a configuration of a R/W channel IC which constitutes a high recording-density (high-order mode) record/playback system of the floppy disk drive shown in FIG. 1, FIGS. 5A–5C are diagrams for describing a dc erase process and an intermediate wavelength erase process for a high recording-density (high-order mode) floppy disk.

The disk controller 41 is electrically connected to the bus 32. Operations of the disk controller 41 and the R/W channel IC 43 are respectively controlled by the DSP 31. The disk controller 41 is electrically connected to the host computer (not shown) through an EIDE (Extended Intelligent Drive Electronics) interface. FIG. 4 shows the R/W channel IC 43.

The R/W channel IC 43 includes, as a recording system, a 16/17 encoder 51 for performing an encoding process using RLL (Run Length Limited) 16/17 codes, which is used as a digital modulating process, on NRZ (Non Return to Zero) write data WD (8-bit parallel data) supplied from the disk controller 41, and for outputting the processed data as the same NRZ data, a precoder 52 for providing partial response equalization and interference of a reverse characteristic for data (serial data) outputted from the 16/17 encoder 51, and a write compensation circuit 53 for compensating for a phase shift produced in data outputted from the precoder 52 upon reproduction in advance upon recording. The output from the encoder 51 is the RLL and NRZ serial data. Therefore, the output from the encoder 51 is the data within a predetermined frequency range.

Further, the R/W channel IC 43 has, as the recording system, a multiplexer 54 for selectively taking out or fetching data (serial data) outputted from the write compensation circuit 53 or data represented in the form of the least significant bit, of the write data WD, and a D flip-flop 55 for toggling the multiplexer 54 so that the output data value of the multiplexer 54 is inverted each time the output data of the multiplexer 54 reaches "1", to thereby obtain a record signal SR.

Now, the 16/17 encoder 51 and the precoder 52 are supplied with an on/off control signal $S_{ON/OFF}$ for controlling each of them to an operating state or a non-operating state from the DSP 31. Although each of the encoder 51 and the precoder 52 is normally placed in the operating state in this case, they go into the non-action when a medium wavelength erase is performed as will be described later. Thus, when the encoder 51 and the precoder 52 are respectively placed in the inactive state, the output data of the precoder 52 becomes equal to the write data WD supplied from the disk controller 41.

The multiplexer 54 is supplied with a switching control signal SW from the DSP 31. Although the multiplexer 54 is normally placed in a state of taking out the output data of the write compensation circuit 53 in this case, the multiplexer 54 is brought into a state of taking out the data represented in the form of the least significant bit of the write data WD when a dc erase is done as will be described later.

The R/W channel IC 43 also includes, as a reproduction system, an AGC (Automatic Gain Control) circuit 61 for holding the amplitude of the played-back signal SP outputted from the playback amplifier 45 constant, a low-pass filter 62 for eliminating an unnecessary high-frequency component from a signal outputted from the AGC circuit 61, an A/D converter 63 for converting a signal outputted from the low-pass filter 62 into a digital signal, and an equalizer 64 for effecting waveform equalization of EPR4 (Extended Partial Response class 4) on the output data of the A/D converter 63.

Further, the R/W channel IC 43 has, as the playback system, a Viterbi decoder 65 used as a data discriminator for effecting a 0/1 data identifying process on data outputted from the equalizer 64, and a 16/17 decoder 66 for performing a decoding process using 16/17 codes on data outputted from the Viterbi decoder 65 to thereby obtain a read data RD. Although not described above, the write data WD is equivalent to one subjected to an interleave after having been added with an error correcting code by the disk controller 41. The read data RD is also placed in a state similar to the write data WD and hence subjected to a deinterleave and an error correction by the disk controller 41.

Moreover, the R/W channel IC 43 has a tracking information detector 67 for detecting tracking information TRI from the output signal of the low-pass filter 62. The tracking information TRI is supplied to the DSP 31. Incidentally, the output signal of the low-pass filter 62 is directly supplied to the DSP 31 where a track number and the like are detected. Further, the DSP 31 controls the VCM driver 39, based on the tracking information TRI and the track number and the like so that the magnetic head 21 is placed on the target track.

Referring back to FIG. 1, the floppy disk drive 10 has an FDD controller 47 as the standard recording-density (low-order mode) record/playback system. The FDD controller 47 is electrically connected to the host computer (now shown) through an FDD (Floppy Disk Drive) interface. The FDD controller 47 has the functions of producing a record signal from MFM (Modified Frequency Modulation) data sent from the host computer upon writing and supplying it to the head chip 22 of the magnetic head 21 and obtaining MFM data from the signal reproduced from the head chip 22 upon reading and supplying it to the host computer, and the like.

The operation of the floppy disk drive 10 shown in FIG. 1 will next be explained. A description will be made of the operation thereof at the time that the standard recording-density (low-order mode) floppy disk 11B is mounted to the floppy disk drive 10 as the floppy disk 11. In this case, the mode signal SMD supplied to the DSP 31 from the disk detector 34 exhibits the low-order mode. Therefore, the spindle motor driver 36 is controlled by the DSP 31 based on the frequency signal SFG outputted from the spindle motor 35, so that the floppy disk 11 is rotated at the normal speed (e.g., 300 rpm). Further, the standard recording-density (low-order mode) record/playback system is put in use under the control of the DSP 31.

In such a state, the MFM data used as write data is supplied to the FDD controller 47 from the host computer through the FDD interface upon writing. The FDD controller 47 outputs a record signal corresponding to the MFM data so as to be supplied to the head chip 22 of the magnetic head 21, after which the signal is recorded on a target sector on a target track of the floppy disk 11. Upon reading on the other hand, the signal played back from the target sector on the target track of the floppy disk 11 by the head chip 22 is supplied to the FDD controller 47 where the MFM data corresponding to the playedback signal is outputted and supplied to the host computer. In other words, in the low-order mode, the record signal can be recorded with a single process.

A description will be made of the operation of the floppy disk drive at the time that the high recording-density (high-order mode) floppy disk 11A is mounted to the floppy disk drive as the floppy disk 11. In this case, the mode signal SMD supplied to the DSP 31 from the disk detector 34 exhibits the high-order mode. Therefore, the spindle motor driver 36 is controlled by the DSP 31 based on the frequency signal SFG outputted from the spindle motor 35, so that the floppy disk 11 is rotated at the high speed (e.g., 3600 rpm). Further, the high recording-density (high-order mode) record/playback system is put into use under the control of the DSP 31.

In such a state, writing data is supplied to the disk controller 41 from the host computer through the EIDE interface upon writing and temporarily stored in the DRAM 42. Next, the disk controller 41 effects an error correcting code addition and an interleave on the writing data to produce write data WD.

When first recording is made to the target sector on the target track of the floppy disk 11, the disk controller 41 supplies write data WD to the R/W channel IC 43 from which a record signal SR corresponding to the write data WD is outputted and supplied to the head chip 23 of the magnetic head 21, whereby the signal is recorded on the target sector on the target track while the floppy disk 11 is being rotated once.

On the other hand, when any data is already recorded on the target sector on the target track of the floppy disk 11 and overwrite is made to the target sector, recording is done in accordance with the following process steps. In a case of initially recording the data on the target sector, the following process may be available.

①A dc erase is first effected on a target sector on a target track at the first rotation of the floppy disk 11. In this case, the disk controller 41 supplies write data WD for allowing the least significant bit to be always "0" to the R/W channel IC 43 (see FIG. 4) and the multiplexer 54 of the R/W channel IC 43 is switched so as to output the least significant bit of the write data WD in response to the switching control signal SW outputted from the DSP 31. Thus, the multiplexer 54 outputs only data "0" and hence a record signal SR outputted from the D flip-flop 55 will be fixed to a signal of "0" or "1". Therefore, a dc magnetic field is produced from the head chip 23 of the magnetic head 21, whereby the dc erase is carried out.

Figure 5A:
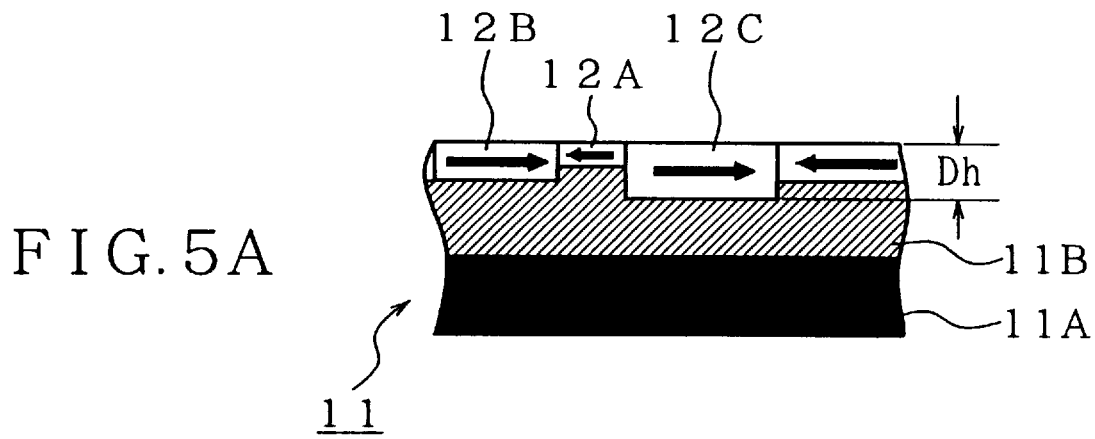
Figure 5B:
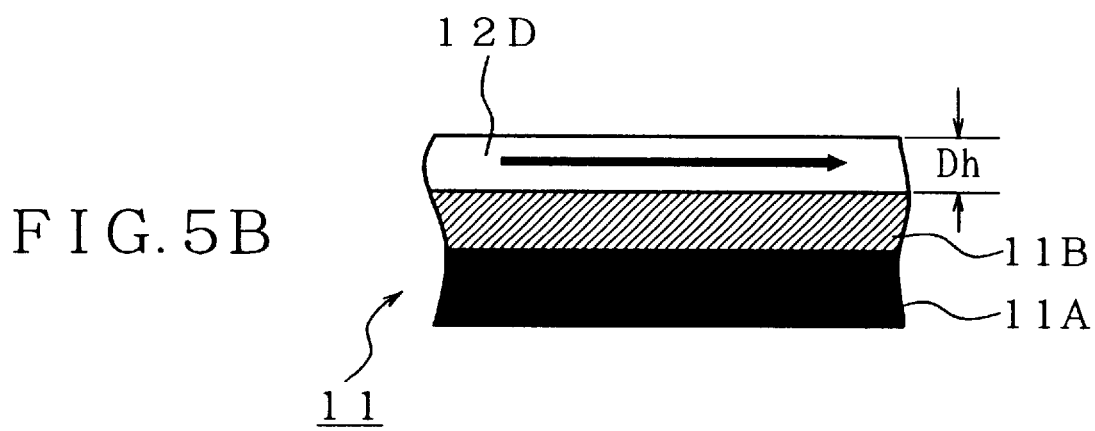

FIG. 5A shows a recorded state of a floppy disk 11 before the execution of the dc erase, i.e., in its initial state. In this case, magnetized patterns based on the record signal SR are already formed over a magnetic film 11B used as a recording layer mounted onto a disk substrate 11A. As shown in FIG. 5A, the magnetic pattern 12A of the short wavelength is recorded until a shallow position, the magnetic pattern 12B of the medium wavelength has a deeper recording position than the magnetic pattern 12A of the short wavelength and the magnetic patter 12C of the long wavelength has a deeper recording position than the magnetic pattern 12B of the medium wavelength. The symbol Dh is representative of a recording depth of the magnetic pattern of the long wavelength. FIG. 5B illustrates a recorded state of a floppy disk 11 after having been subjected to the dc erase. In this instance, a magnetized pattern 12D whose direction of magnetization is one direction, is formed over a magnetic film 11B.

②An intermediate wavelength erase is next effected on a target sector on a target track at the second rotation of the floppy disk 11. In this case, the disk controller 41 supplies write data WD brought to [1010101010 . . . ] when given as serial data to the R/W channel IC 43. Further, the multiplexer 54 of the R/W channel IC 43 is switched so as to drive the output data of the write compensation circuit 53 in response to the switching control signal SW outputted from the DSP 31. In this case, each of the 16/17 encoder 51 and the precoder 52 is brought to the non-operating state by the on/off control signal $S_{ON/OFF}$ outputted from the DSP 31, so that the output data of the precoder 52 becomes equal to the write data WD.

Thus, each data is outputted from the multiplexer 54 like "1010101010 . . . ", and the record signal SR outputted from the D flip-flop 55 is alternately brought to the signal of "0" and the signal of "1" every time when the output from the multiplexer 54 becomes the signal "0". This record signal SR is supplied to the head chip 23 of the magnetic head 21 and thereafter recorded. The output from the multiplexer 54 is "1111 . . . " in the case of the short wavelength and is, for example, "1001001001001 . . . " in the case of the long wavelength. As to another example, the frequency of a channel clock of the R/W channel IC 43 may be controlled by the DSP 31 so that the frequency of the record signal SR takes a substantially intermediate frequency in a frequency band of the finally-recorded record signal SR.

Figure 5C:
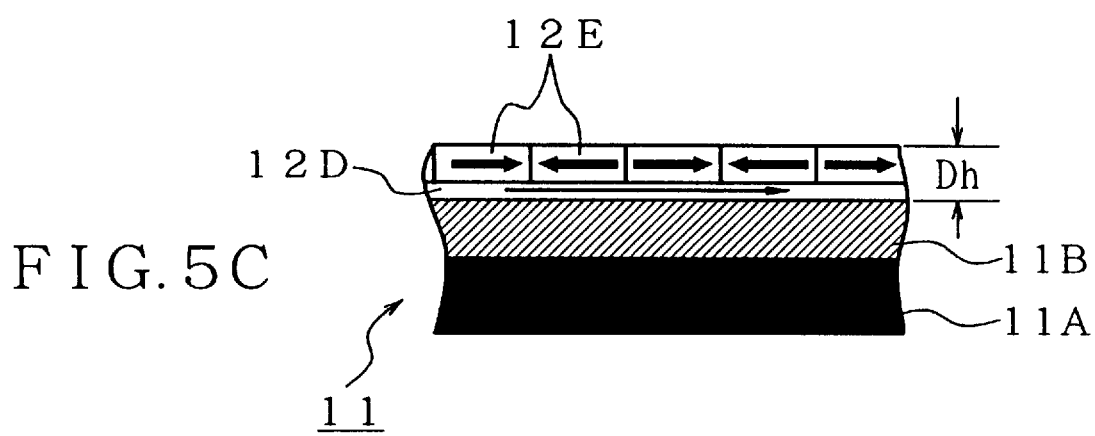

FIG. 5C shows a recorded state of a floppy disk 11 after having been subjected to an intermediate wavelength erase. In this case, magnetized patterns whose direction of magnetization is alternately reversed and which are constant in length, are formed over a magnetic film 11B. Incidentally, one-direction extending magnetic pattern produced by the dc erase slightly remains in a deeper layer portion of the magnetic film 11B or the rear side of the paper of FIG. 5C.

③ A record signal SR (updated data) corresponding to writing data supplied from the host computer is next recorded on a target sector on a target track at the third rotation of the floppy disk 11. In this case, the disk controller 41 supplies write data WD produced by effecting an error correcting code addition and an interleave on the writing data to the R/W channel IC 43. Thereafter, the encoder 51 performs encoding using 16/17 codes on the write data WD and the precoder 52 effects a precode thereon. Further, the write compensation circuit 53 performs write compensation on the precoded data and thereafter the multiplexer 54 takes out the output data of the write compensation circuit 53. Thus, the record signal SR corresponding to the writing data supplied from the host computer is obtained from the D flip-flop 55. This record signal SR is supplied to the head chip 23 of the magnetic head 21 and recorded after it has been amplified by the recording amplifier 44. This forms a magnetic pattern 12E in accordance with the record signal SR.

Upon reading on the other hand, the signal reproduced by the head chip 23 from the target sector on the target track of the floppy disk 11 is amplified by the playback amplifier 45, followed by supply to the R/W channel IC 43. Thereafter, the R/W channel IC 43 effects a waveform equalizing operation, a data discriminating operation, a decoding operation using 16/17 codes, etc. on the supplied signal to thereby obtain read data RD. The read data RD is supplied to the disk controller 41 where a deinterleave and an error correction are effected thereon to obtain final read data. This read data is temporarily stored in the DRAM 42 and thereafter supplied to the host computer.

In the present embodiment as has been described above, when the floppy disk 11 is given as the high recording-density (high-order mode) floppy disk 11A and the overwrite is made to the target sector on the target track of the floppy disk 11, the dc erase is done by the head chip 23 of the magnetic disk 21 and the intermediate wavelength erase is further performed. Thereafter, the record signal SR (updated data) corresponding to the writing data is recorded. Thus, a predetermined overwrite characteristic can be ensured by a single head alone. Since the magnetized pattern used as a bed is formed over the magnetic film 11B by the intermediate wavelength erase, the generation of waveform distortion due to one-direction magnetized pattern by the dc erase can be restrained. Incidentally, when only the dc erase is performed and the intermediate wavelength erase is not carried out, for example, when an N pole-based dc erase is done, the excitation of the updated data at an S pole weakens the magnetic field and the excitation of the updated data at an N pole strengthens the magnetic field, whereby waveform distortion is produced.

Figures 6, 7:
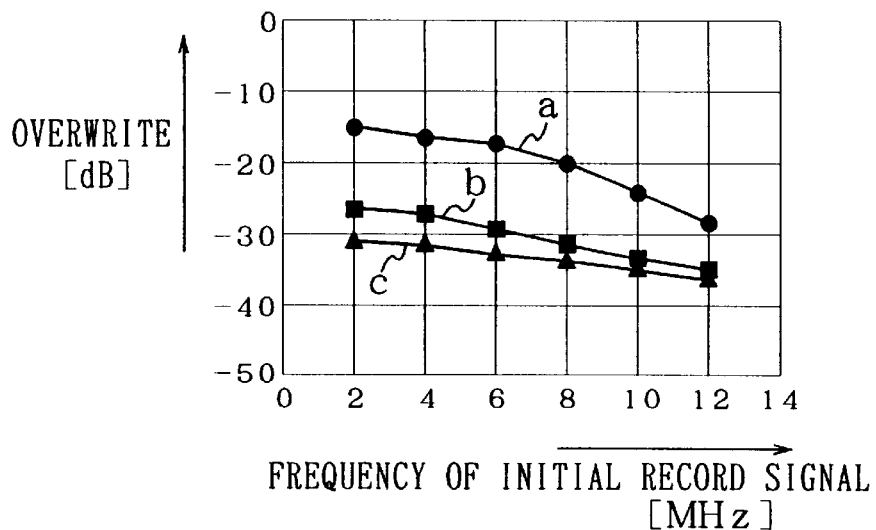

FIG. 6 shows the relationship between the frequency of an initial record signal and overwrite characteristic [dB]. The overwrite characteristic is representative of a decibel of the un-erased initial record signal that remains after the overwrite operation. A curve a indicates an overwrite characteristic [dB] at the time that a signal of 35 MHz is overwritten. A curve b indicates an overwrite characteristic [dB] at the time that the dc erase is executed. These curves a and b indicate that the desired overwrite characteristic is hard to get as the frequency of the overwrite signal is increased and the frequency of the initial record signal is reduced. On the other hand, a curve c indicates an overwrite characteristic [dB] at the time that the dc erase is done and a signal of 20 MHz is overwritten, and shows the expectation of a few dB of improvement in overwrite characteristic [dB]. Incidentally, the overwrite characteristic [dB] indicates the ratio of a reproduced or played-back signal level of an initial record signal at the time that a signal is recorded in overlap form or a dc erase is executed, to a reproduced signal level of an initial record signal in an initial recorded state.

FIG. 7 shows improvements in overwrite characteristic at the time that the dc erase and the intermediate wavelength erase are executed as described above. A signal of 2 MHz was recorded as the initial record signal. When the dc erase is effected on the initially-recorded state, the overwrite characteristic [dB] resulted in −24.9 [dB]. Further, when the signal of 20 MHz is recorded in overlap form and the intermediate wavelength erase is carried out, the overwrite characteristic [dB] became −30.8 [dB] Thereafter, when a signal of 35 MHz is recorded as updated data, the overwrite characteristic [dB] resulted in −30.9 [dB]. When the signal of 35 MHz is overwritten as the updated data without the erase as indicated by the curve a in FIG. 6, the overwrite characteristic [dB] remains at about 15 [dB]. However, the overwrite characteristic [dB] will result in −30.9 dB by the execution of the dc erase and the intermediate wavelength erase as mentioned above. It is thus understood that the overwrite characteristic would be greatly improved.

Although the aforementioned embodiment shows the case in which the present invention has been applied to the floppy disk drive 10, it is needless to say that the present invention can be applied even to another drive apparatus using a magnetic disk, such as a hard disk, etc.

According to the present invention, when record data (updated data) is recorded on a magnetic disk, a dc erase is performed and erasing data of a constant frequency is further recorded. Thereafter, the record data is recorded therein. Thus, a requested overwrite characteristic can be ensured and the entire head can be reduced in cost. Since a magnetized pattern used as a bed is formed over a magnetic film owing to the recording of the erasing data, waveform distortion can be restrained from being produced due to the magnetized pattern formed from the dc erase. In addition, the above-discussed advantages can be established only by single head.

It will be appreciated that the invention is not restricted to the particular embodiments that have been described, and that variations may be made therein without departing from the scope of the invention as defined in the appended claims and equivalents thereof.

What is claimed is:

1. A magnetic recording apparatus for use with a magnetic record medium, the magnetic recording apparatus comprising:
    a magnetic head for applying a magnetic field to the magnetic record medium to form a magnetized pattern on the magnetic record medium thereby recording record data;
    conversion means for converting input data into the record data having a predetermined frequency range; and
    control means for controlling said magnetic head so as to apply a DC magnetic field to a record area of the magnetic record medium, to apply to said record area a magnetic field that is inverted at a constant period corresponding to an intermediate frequency within said predetermined frequency range, and to apply to said record area a magnetic field that is inverted in accordance with the record data, when said magnetic head records the record data on the record area.

2. The magnetic recording apparatus according to claim 1, wherein said magnetic record medium is a magnetic disk.

3. The magnetic recording apparatus according to claim 1, wherein said magnetic head records the information on said magnetic record medium under a condition that said magnetic head floats over said magnetic record medium.

4. The magnetic recording apparatus according to claim 1 further comprising:
    selection means for outputting selectively the output from said conversion means or a fixed value; and
    inversion means for receiving the output from said selection means and inverting the magnetic field when the output from said conversion means becomes a predetermined value different from said fixed value;
    wherein said control means controls said magnetic head by controlling said selection means and said inversion means.

5. The magnetic recording apparatus according to claim 4, wherein said control means controls said selection means to output the fixed value when said magnetic head applies the DC magnetic field to said record medium, and said control means controls said conversion means to output the record data having the intermediate frequency within the predetermined frequency range when applying the magnetic field that is inverted at the predetermined constant period, and said control means controls said conversion means to output the record data that is inverted in accordance with the record data when applying to said record area the magnetic field that is inverted in accordance with the record data.

6. A method of recording record data on a predetermined area of a magnetic record medium, comprising the steps of:
    applying a DC magnetic field to the predetermined area with a magnetic head;
    applying to the predetermined area, with the magnetic head, a magnetic field that is inverted at a constant period to an intermediate frequency within a frequency range of the record data; and
    applying to the predetermined area, with the magnetic head, a magnetic field that is inverted in accordance with the record data.

* * * * *